United States Patent
Bronicki et al.

[19]

[11] Patent Number: 5,934,065

[45] Date of Patent: Aug. 10, 1999

[54] APPARATUS FOR GENERATING POWER UTILIZING LOWGRADE AND HIGH GRADE FUELS

[75] Inventors: Lucien Y. Bronicki, Yavne; Benjamin Doron, Jerusalem; Joseph Sinai, Ramat Gan, all of Israel

[73] Assignee: Ormat Industries Ltd., Yavne, Israel

[21] Appl. No.: 08/841,785

[22] Filed: May 5, 1997

Related U.S. Application Data

[62] Division of application No. 08/521,812, Aug. 31, 1995, Pat. No. 5,664,414.

[51] Int. Cl.⁶ ..................................................... F02C 6/00
[52] U.S. Cl. ................................ 60/39.181; 60/39.281; 60/39.463; 60/39.511; 60/39.683
[58] Field of Search ............................. 60/39.181, 39.182, 60/39.281, 39.463, 39.511, 683

[56] References Cited

U.S. PATENT DOCUMENTS

| | | | |
|---|---|---|---|
| 2,663,144 | 12/1953 | Nordstrom et al. | 60/39.511 |
| 4,164,124 | 8/1979 | Taylor et al. | 60/683 |
| 4,184,325 | 1/1980 | Mandrin | 60/39.181 |
| 5,632,143 | 5/1997 | Fisher et al. | 60/39.181 |
| 5,640,842 | 6/1997 | Bronicki | 60/39.181 |

*Primary Examiner*—Charles G. Freay
*Attorney, Agent, or Firm*—Nath & Associates; Gary M. Nath; Jerald L. Meyer

[57] ABSTRACT

Apparatus for generating power includes a gas turbine unit having a compressor for compressing ambient air and producing compressed air, a combustion chamber to which the compressed air is supplied, a source of relatively high grade fuel for burning in the combustion chamber and producing combustion gases, and a gas turbine connected to generator and to the compressor for expanding the combustion gases and producing exhaust gases. The apparatus further includes a combustor that burns relatively low grade fuel, and produces combustion products, and an indirect contact heat exchanger responsive to the combustion products for heating the compressed air before the latter is applied to the combustion chamber, and for producing cooled combustion products. In addition, an energy converter is provided having an organic working fluid responsive to the exhaust gases for converting heat in the exhaust gases to electricity. Finally, the apparatus of the invention serves to minimize the consumption of high grade fuel in the presence of changes in the heating value of the low grade fuel.

16 Claims, 5 Drawing Sheets

APPARATUS FOR GENERATING POWER UTILIZING LOWGRADE AND HIGH GRADE FUELS

This application is a division of application Ser. No. 08/521,812, filed Aug. 31, 1995, now U.S. Pat. No. 5,664,414.

TECHNICAL FIELD

This invention relates to a method of and apparatus for generating power, and more particularly, to a combined cycle, gas turbine-based power plant, and tc a method for generating power therefrom.

BACKGROUND ART

Combined cycle, gas turbine-based power plants are becoming popular today throughout the world because of their high efficiency, reliability, and ruggedness. Conventionally, such power plants include a gas turbine unit having a compressor for compressing ambient air and producing compressed air, a combustion chamber to which the compressed air is supplied, a source of fuel for burning in the combustion chamber and producing combustion gases, and a gas turbine connected to and driving a generator and the compressor for expanding the combustion gases and producing exhaust gases.

The apparatus further includes an energy converter which uses water as a working fluid and which is responsive to the exhaust gases of the turbine for converting heat in the exhaust gases to electricity. The cooled exhaust gases are then vented to the atmosphere.

The use of water as the working fluid of the energy converter, and the presence of a steam turbine, results in a complex power plant operating on high pressure steam which adversely affects operating expenses of the power plant. For example, the plant must be manned at all times by a licensed steam engineer; and a water treatment system is required. Condenser vacuum problems must be taken into account, and special provision must be made for winter operation when the temperature is below freezing.

It is an object of the present invention to provide new and improved apparatus, and method for using the same, for generating power which is less complex in construction and easier to maintain than the conventional apparatus described above.

DISCLOSURE OF THE INVENTION

Apparatus for generating power according to the present invention includes a gas turbine unit having a compressor for compressing ambient air and producing compressed air, a combustion chamber to which the compressed air is supplied, a source of relatively high grade fuel for burning in the combustion chamber and producing combustion gases, and a gas turbine connected to a generator and to the compressor for expanding the combustion gases and producing exhaust gases. The apparatus further includes a combustor which burns relatively low grade fuel and produces combustion products, and an indirect contact heat exchanger responsive to the combustion products for heating the compressed air before the latter is applied to the combustion chamber, and for producing cooled combustion products. In addition, heat in the exhaust gases of the turbine are utilized by feeding back these gases to the combustor, or applying them to an energy converter containing an organic working fluid that converts heat in the exhaust gases to electricity, and produces cooled exhaust gases which are directed to a stack, or optionally, to the combustor.

According to the present invention, the low grade fuel burned or combusted in the combustor comprises inexpensive fuel such as low grade coal, oil shale, petcoke, asphaltene refuse, or waste. In the latter case, the combustor may be an incinerator.

The use of an organic fluid instead of water as the working fluid of the energy converter permits unmanned operation of the power plant, and eliminates the need for water treatment, vacuum pumps for the condenser, and problems with freezing temperatures. Furthermore, the present invention permits a high total plant efficiency while at the same time achieves relatively low fuel consumption of high grade fuels, such as natural gas, kerosene, liquid petroleum gas, etc., used in the combustion chamber of the gas turbine. This is extremely important when the inexpensive fuel is a material which has to be disposed of such as waste, or solid waste, refinery residues, mine culm, etc.

Preferably, the energy converter includes a vaporizer containing an organic fluid that is vaporized by the exhaust gases of the gas turbine unit and which produces cooled exhaust gases, an organic vapor turbine responsive to vaporized organic fluid produced by the vaporizer for producing power and expanded organic vapor, and an organic vapor condenser responsive to the expanded organic vapor for condensing the latter to condensate. Means are provided for returning the condensate to the vaporizer.

Preferably, the organic fluid is selected so that the condenser pressure is close to, but above atmospheric pressure. Suitable working fluids are normal pentane and iso-pentane.

The invention also consists in means for accommodating the use of relatively low grade fuel burned in said combustor when the heating value of such fuel varies over time, which is a typical characteristic of low grade fuels. Apparatus according to the invention includes an element for generating a control signal related to the temperature of combustion gases produced by burning the relatively high grade fuel in the combustion chamber associated with the gas turbine, and control means responsive to the control signal for controlling the rate at which the relatively high grade fuel is burned in the combustion chamber. Such apparatus rapidly compensates for a reduction in heating value of the low grade fuel supplied to the combustor by rapidly increasing the rate at which high grade fuel is fed to the combustion chamber. Preferably, in addition, the apparatus also increases the rate at which the low grade fuel is supplied to the combustor in order to return the feed rate of the high grade fuel to its original value as quickly as possible. If the heating value of the low grade fuel increases, the apparatus of the invention is effective to reduce the feed rate of the high grade fuel. Ultimately, the apparatus of the invention serves to minimize the consumption of high grade fuel in the presence of changes in the heating value of the low grade fuel.

In this manner, the temperature of the combustion gases are maintained at a substantially constant temperature for a given electrical load independently of changes in the heating value of the relatively low grade fuel burned in said combustor.

In a further embodiment of the invention, the low grade fuel is used directly for producing steam, and the exhaust gases from the gas turbine are used for superheating the steam, the excess heat in the exhaust gases being used for producing power using an organic Rankine cycle energy converter. This embodiment is particularly suitable for retrofitting an existing incinerator plant where the required maintenance of the steam system is tolerable.

BRIEF DESCRIPTION OF DRAWINGS

Embodiments of the invention are shown by way of example in the accompanying drawings wherein.

DETAILED DESCRIPTION

Figure 1A:
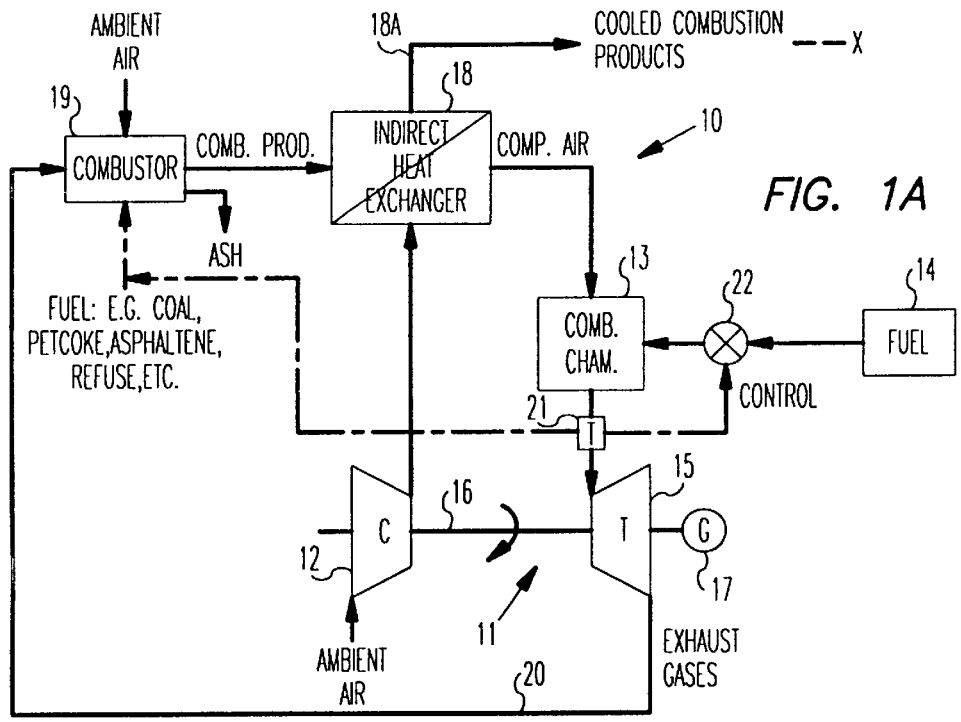
FIG. 1A is a block diagram of one embodiment of apparatus for generating power according to the present invention.

A power plant according to the present invention is designated by reference numeral 10 in FIG. 1, and comprises gas turbine unit 11 having compressor 12 for compressing ambient air and producing compressed air, combustion chamber 13 to which the compressed air is supplied, source 14 of relatively high grade fuel for burning in the combustion chamber and producing combustion gases, and gas turbine 15 connected by shaft 16 to generator 17 and to the compressor for expanding the combustion gases and producing exhaust gases.

Indirect contact heat exchanger 18 is interposed between compressor 12 and combustion chamber 13. Heat exchanger 18 is responsive to combustion products for heating the compressed air before the latter is applied to combustion chamber 13, and for producing cooled combustion products containing heat that is utilized as described below. Combustion products applied to heat exchanger 18 are produced by combustor 19 which burns relatively low grade fuel and produces ash that is disposed of in a conventional manner. The low grade fuel which is burned or combusted in combustor 19 may comprise inexpensive fuels such as low grade coal, petcoke, asphaltene refuse, or waste. In the latter case, the combustor may be an incinerator.

According to the invention, means are provided for utilizing heat in the exhaust gases produced by the turbine. In the embodiment of the invention shown in FIG. 1A, such means includes apparatus 20 for feeding back the exhaust gases to combustor 19. In many situations, the heating value of the relatively low grade fuel burned in combustor 19 varies over time, and to accommodate the use of this fuel without sacrificing the efficiency or output of power plant 10, the plant may include element 21 for generating a control signal related to the temperature of combustion gases produced by burning fuel in combustion chamber 13. Specifically, a thermocouple may be utilized in combustion chamber 13 or in the outlet thereof for sensing the temperature of the combustion gases produced by burning fuel in the combustion chamber.

Element 21 generates a control signal proportional to the temperature of the combustion gases; and control means 22 is responsive to the control signal for controlling the rate at which fuel from source 14 is supplied to the combustion chamber. The control is such that, for a substantially constant electrical load, the combustion gases are maintained at a substantially constant temperature independently of changes in the heating value of the relatively low grade fuel burned in said combustor. In other words, when the heating value of the relatively low grade fuel decreases, the resultant reduced temperature of the compressed air heated in indirect heat exchanger 18 will result in incipient reduction in the temperature of combustion gases produced by combustion chamber 13. This incipient change is sensed by element 21. The resultant control signal will adjust control means 22 to effect an increase in fuel from source 14 to the end that the temperature of combustion gases is maintained at a predetermined level independently of changes in the heating value of the low grade fuel combusted in combustor 19.

Preferably, the control signal generated by element 21 is also used to control the feed rate of fuel to the combustor. That is to say, when the heating value of the low grade fuel decreases, and the feed rate of high grade fuel is increased to maintain the temperature of the combustion gases, the control signal is also effective to increase the feed rate of low grade fuel and return the feed rate of the high grade fuel to its original value as quickly as possible. As a consequence of the operation of element 21 and fuel feed-rate controllers associated with combustor 19 and combustion chamber 13, the apparatus of the present invention serves to minimize the consumption of high grade fuel in the presence of changes in the heating value of the low grade fuel.

Figure 1B:
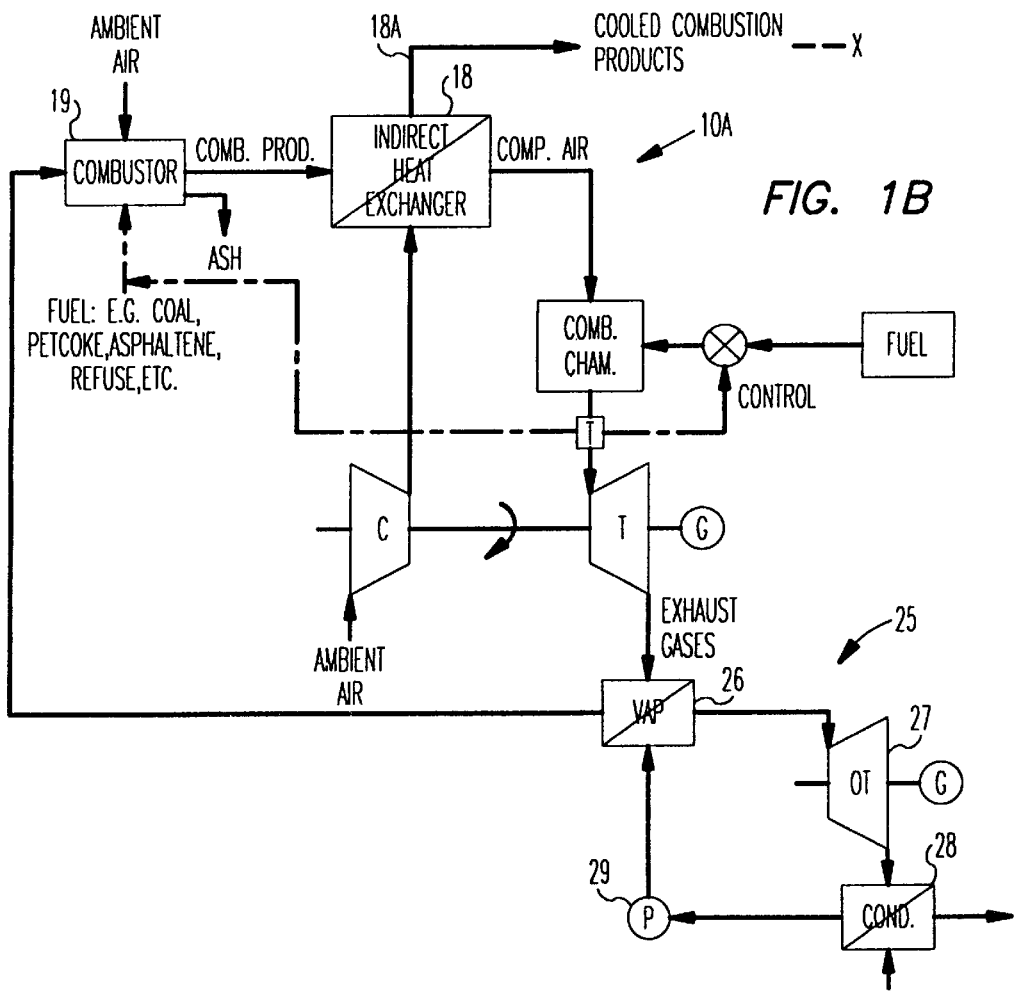
FIG. 1B is a block diagram of another embodiment of the present invention.

In the embodiment of the invention shown in FIG. 1B, the means for utilizing heat in the exhaust gases produced by the turbine is in the form of an energy converter having an organic working fluid, and responsive to the turbine exhaust gases for converting heat therein to electricity. As shown in FIG. 1B, power plant 10A is essentially the same as power plant 10 shown in FIG. 1A, except that the exhaust gases from the gas turbine of plant 10A are fed back to the combustor via energy converter 25 and are thus cooler than the exhaust gases of plant 10 which are fed back to the combustor. Energy converter 25 includes vaporizer 26 containing an organic fluid that is vaporized by the applied exhaust gases and which produces cooled exhaust gases that are fed back to combustor 19.

Converter 25 also includes organic vapor turbine 27 responsive to vaporized organic fluid produced by vaporizer 26 for producing power and expanded organic vapor, and organic vapor condenser 28 responsive to the expanded organic vapor for condensing the latter to condensate. Cycle pump 29 constitutes means for returning the organic condensate to vaporizer 26. While a pump is shown in FIG. 1B, it is possible to use gravity to feed the organic condensate from the condenser to the vaporizer by positioning the condenser at an elevation sufficiently above the vaporizer. Moreover, condenser 28 may be water-cooled or air-cooled depending on environmental conditions.

Preferably, the organic fluid associated with converter 25 is selected so that the pressure in condenser 28 is above atmospheric pressure. Suitable working fluids may be selected from the group consisting of normal pentane and iso-pentane.

Figure 1C:
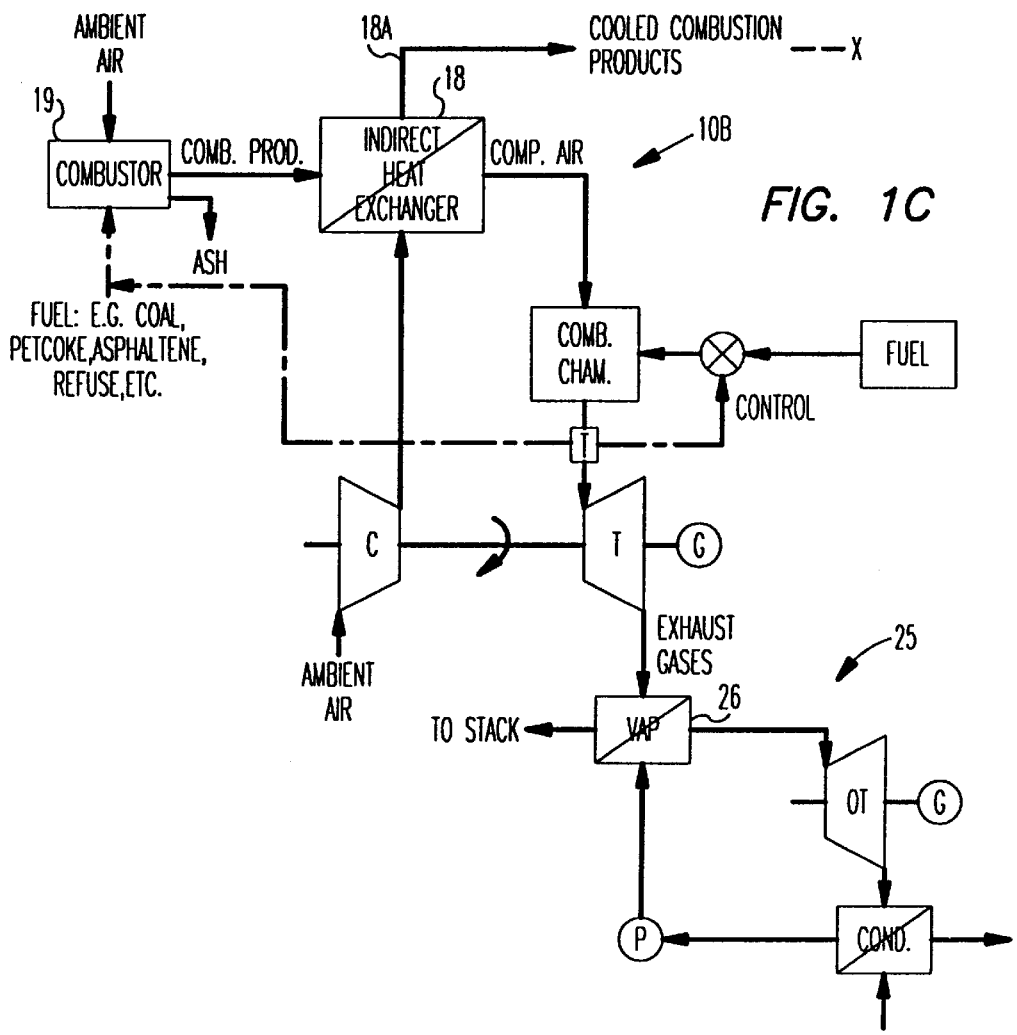
FIG. 1C is a block diagram of further embodiment of the present invention.

The embodiment of FIG. 1C is like the embodiment of FIG. 1B except that cooled exhaust gases produced by vaporizer 26 of converter 25 may be disposed of through a stack instead of being applied to combustor 19.

The cooled combustion products in line 18A produced by indirect heat exchanger 18 as the result of the combustion process carried out in combustor 19, and the heat exchange process carried out in heat exchanger 18 in each of the embodiments of FIGS. 1A–C, may be disposed through a suitable stack. Preferably, however, heat in these cooled combustion products is utilized for useful purposes, such as generating electricity. To this end, an energy converter like that shown schematically by reference numeral 30 in FIG. 2 can be connected to line 18A.

Converter 30 may include vaporizer 31 containing a working fluid such as water, or an organic fluid, which is vaporized by the cooled combustion products, a steam or an organic vapor turbine 32 responsive to the vaporized working fluid produced by said vaporizer for producing power and expanded working fluid, and condenser 33 for the expanded working fluid which is responsive thereto for condensing the latter to a condensate. Means in the form of cycle pump 34 is provided for returning the condensate to vaporizer 31. Condenser 33 may be water-cooled or air-cooled dependent on environmental conditions.

Figure 3:
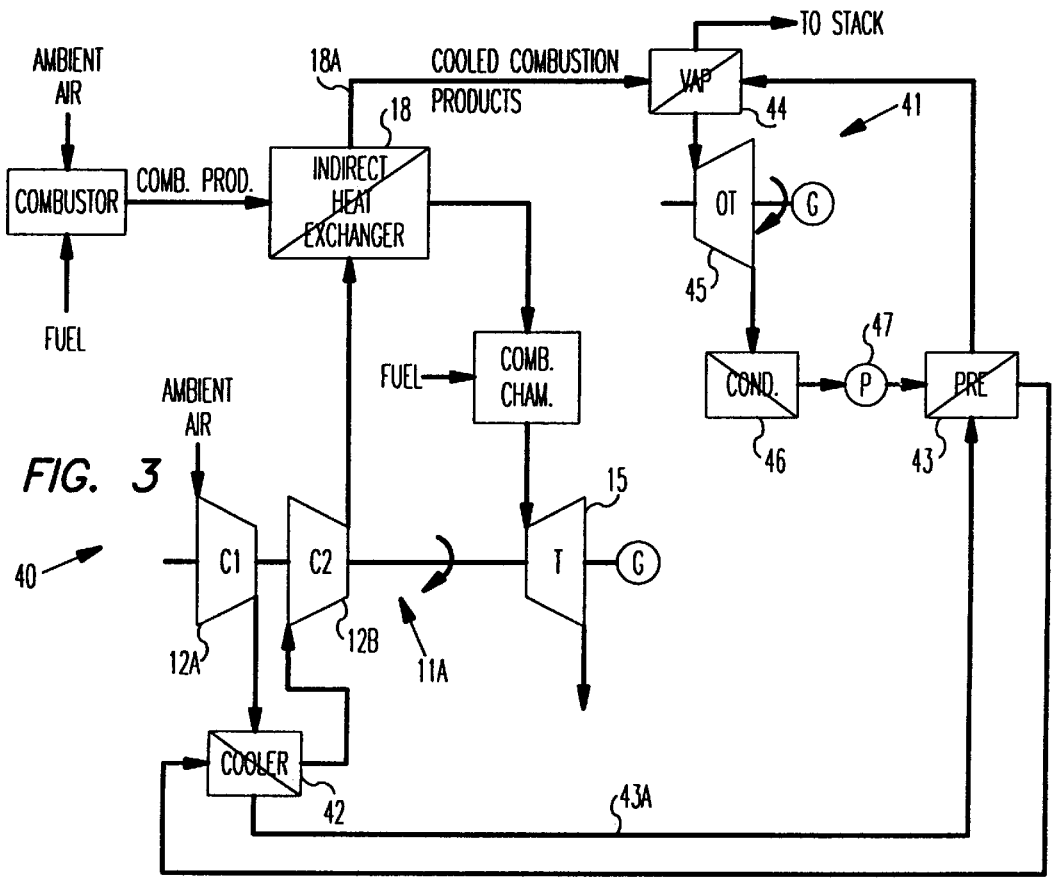
FIGS. 3–7 are block diagrams of other embodiments of the present invention.

In order to increase its specific power and efficiency, the power plant can be configured as shown in FIG. 3 where reference numeral 40 designates a power plant according to the present invention utilizing a preheater for preheating the working fluid of energy converter 41 that operates on the cooled combustion products in line 18A produced by indirect heat exchanger 18. This configuration is particularly suitable when the working fluid of converter 41 is an organic fluid.

In power plant 40, the compressor of gas turbine unit 11A is multi-staged and comprises low pressure stage 12A and high pressure stage 12B. Interstage cooler 42, serially located between the two stages, extracts heat from the ambient air before it is fully compressed, and means 43A applies the extracted heat to pre-heater 43 that is part of converter 41.

Converter 41 may include vaporizer 44 containing an organic fluid which is vaporized by cooled combustion products from heat exchanger 18, organic vapor turbine 45 responsive to the vaporized organic fluid produced by the vaporizer for producing power and expanded vaporized working fluid, and condenser 46 for condensing the expanded organic fluid to a liquid condensate. Cycle pump 47 pumps the condensate back to vaporizer 44 through pre-heater 43 interposed between organic vapor condenser 46 and vaporizer 44. Pre-heater 43 serves to preheat the condensate before it is returned to the vaporizer using heat extracted by intercooler 42. Condenser 46 may be water-cooled or air-cooled dependent on environmental conditions. In this embodiment, if preferred, the exhaust gases exiting gas turbine 15 can be supplied to combustor 19 as shown in FIG. 1A, or to a further energy converter, for example, to an energy converter like that shown in FIG. 1B or FIG. 1C.

Figure 4:
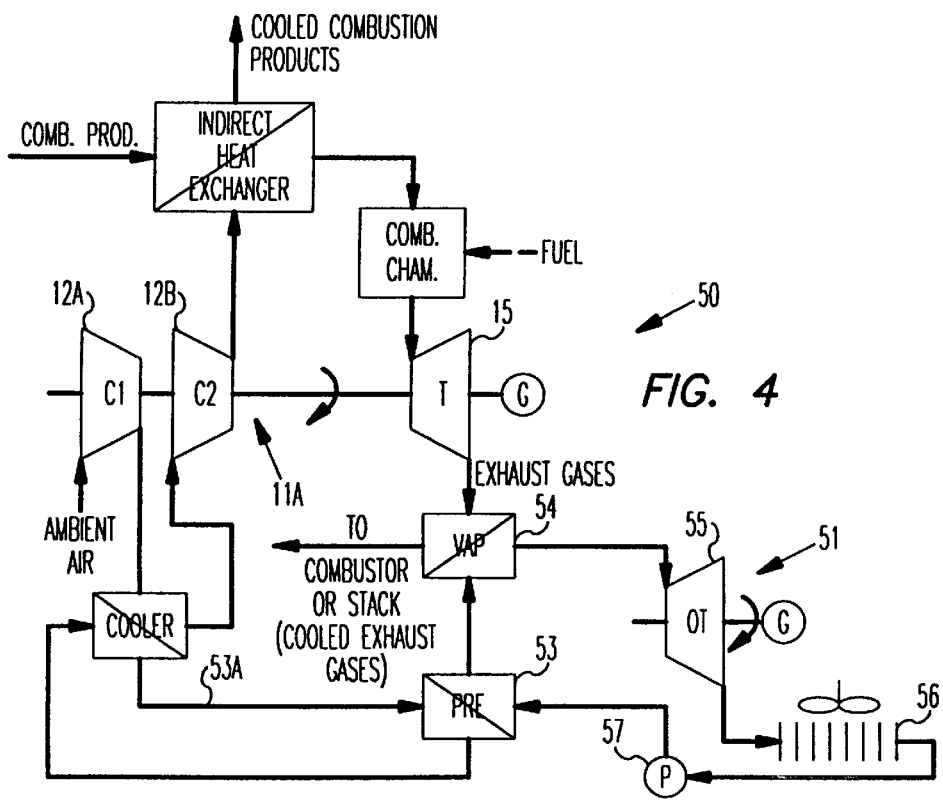

Another way to increase the specific power and efficiency of the power plant is to configure it as shown in FIG. 4 where reference numeral 50 designates a power plant according to the present invention utilizing a preheater for preheating the working fluid of energy converter 51 operating on exhaust gases produced by turbine 15. This configuration is particularly suitable when the working fluid of converter 51 is an organic fluid.

In power plant 50, the compressor of gas turbine unit 11A is multi-staged and comprises low pressure stage 12A and high pressure stage 12B. Interstage cooler 52, serially located between the two stages, extracts heat from the ambient air before it is fully compressed, and means 53A applies the extracted heat to pre-heater 53 that is part of converter 51.

Converter 51 may include vaporizer 54 containing an organic fluid which is vaporized by exhaust gases from turbine 15, organic vapor turbine 55 responsive to the vaporized organic fluid produced by the vaporizer for producing power and expanded vaporized working fluid, and condenser 56 for condensing the expanded organic fluid to a liquid condensate. Cycle pump 57 pumps the condensate back to vaporizer 54 through pre-heater 53 interposed between organic vapor condenser 56 and vaporizer 54. Pre-heater 53 serves to preheat the condensate before it is returned to the vaporizer using heat extracted by intercooler 42. Condenser 56 may be water-cooled or air-cooled dependent on environmental conditions.

Figure 2:
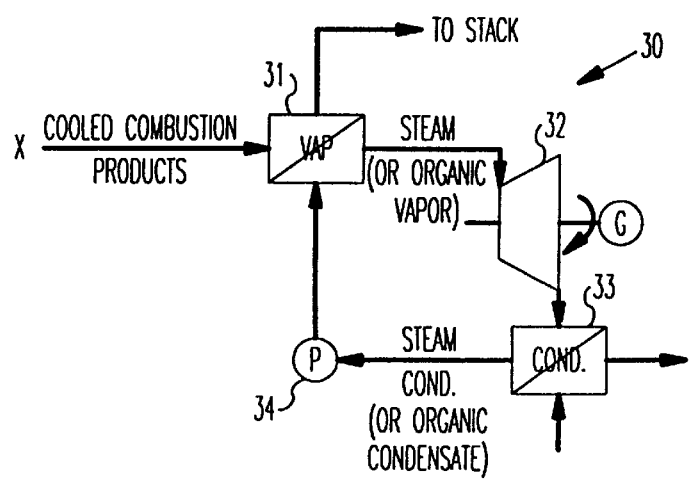
FIG. 2 is a block diagram of apparatus responsive to cooled combustion products produced by the apparatus of FIG. 1 for generating power.

Also in this embodiment, if preferred, cooled combustion products exiting indirect heat exchanger 18 can be supplied to an energy converter such as that shown in FIG. 2, for example. While FIGS. 3 and 4 show heat transfer means 43A and 53A that utilize a heat transfer medium, such as brine or thermal oil, or some other intermediate heat transfer medium, for transferring heat from the intercooler to the preheaters of energy converters 41 and 51, respectively, the preheaters can be directly incorporated into the intercoolers thus eliminating means 43A and 53A and the use of a heat transfer medium.

Figure 5:
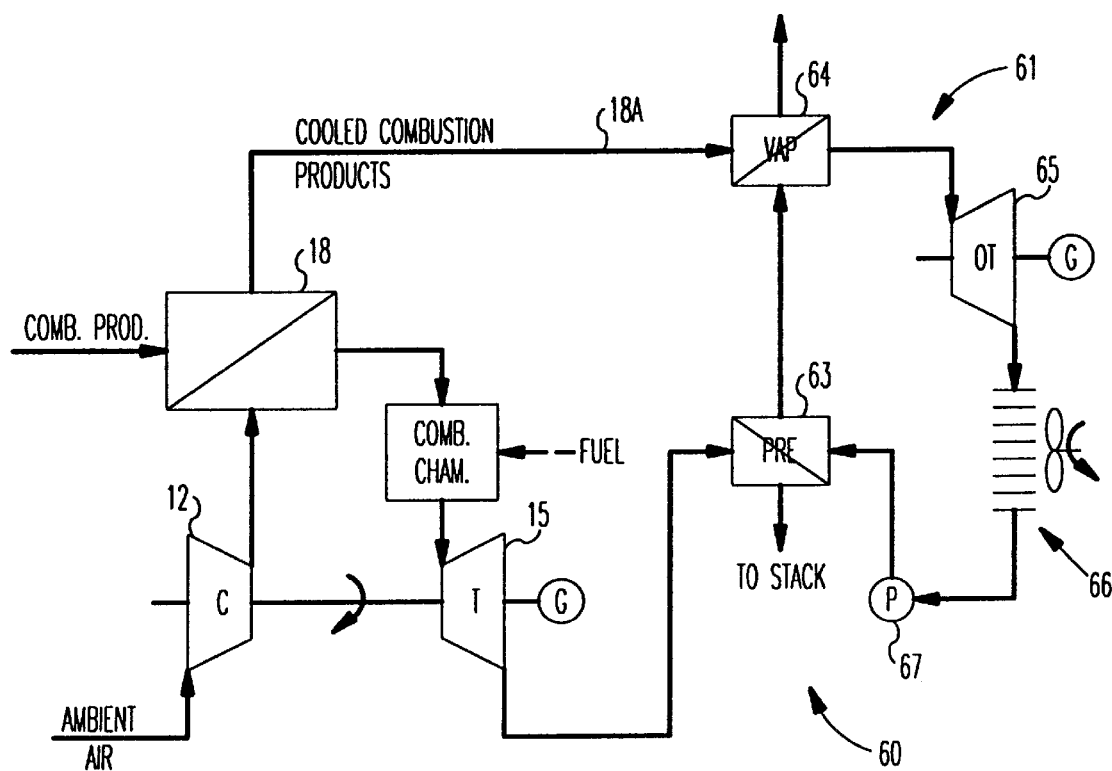

Pre-heating the organic fluid of an energy converter operating on the cooled combustion products produced by indirect contact heat exchanger 18 is another alternative configuration as shown in FIG. 5. Power plant 60 in FIG. 5 includes vaporizer 64 containing an organic fluid which is vaporized by cooled combustion products from heat exchanger 18, organic vapor turbine 65 responsive to the vaporized organic fluid produced by the vaporizer for producing power and expanded vaporized working fluid, and condenser 66 for condensing the expanded organic fluid to a liquid condensate. Cycle pump 67 pumps the condensate back to vaporizer 64 through pre-heater 63 interposed between organic vapor condenser 66 and vaporizer 64. Pre-heater 63 serves to preheat the condensate before it is returned to the vaporizer using heat contained in cooled combustion products produced by heat exchanger 18. Condenser 66 may be water-cooled or air-cooled dependent on environmental conditions.

If preferred in this embodiment, however, the cooled combustion products can be added to the exhaust gases exiting gas turbine 15 producing a hot gas mixture which can then be supplied to the preheater and vaporizer for heating and vaporizing the organic working fluid.

Figure 6:
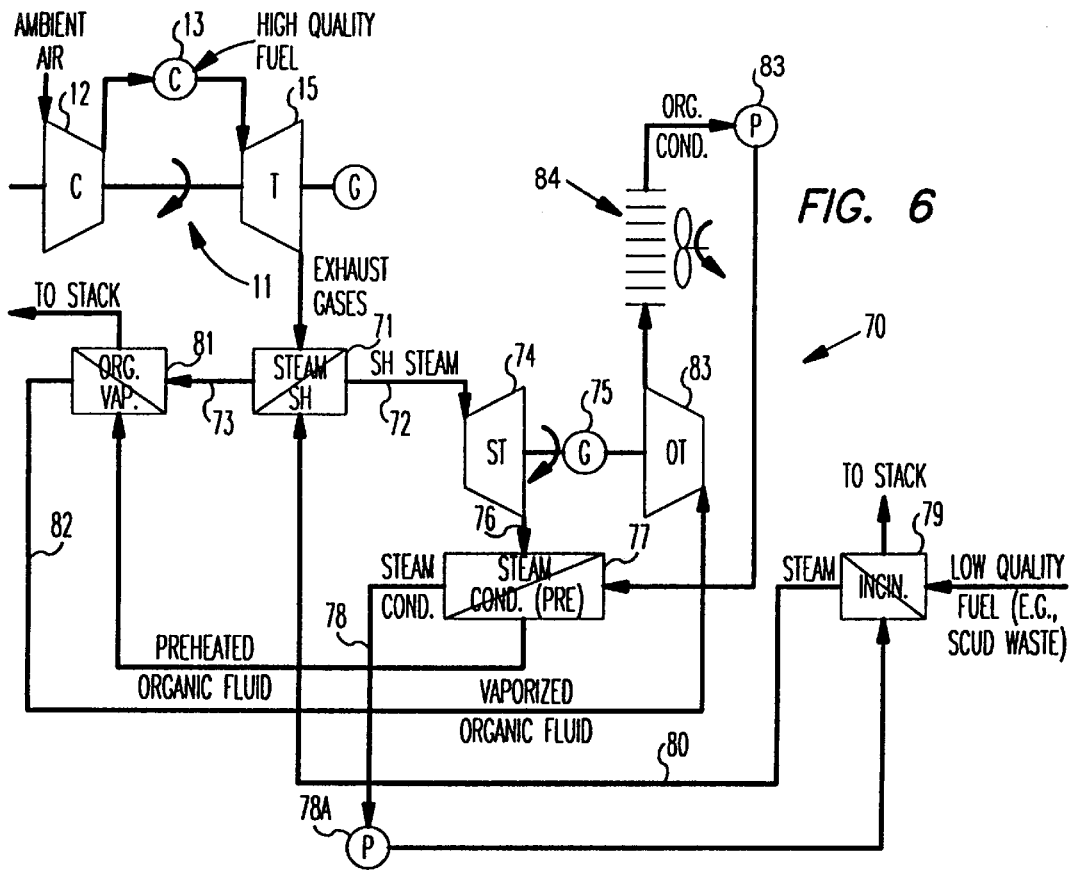

Power plant 70 in FIG. 6 illustrates another aspect of the invention. Plant 70 includes gas turbine unit 11 including compressor 12 driven by gas turbine 15 using combustion chamber 13 for heating air compressed by the compressor. Exhaust gases from turbine 15 are applied to steam superheater 71 which is responsive to the exhaust gases for producing superheating steam in line 72, and cooled exhaust gases in line 73. Steam turbine 74, coupled to generator 75, is responsive to the superheated steam in line 72 for generating power and expanded steam in line 76. Steam condenser 77, containing an organic fluid, condenses the steam into steam condensate in line 78, and thus preheats the organic fluid producing preheated organic fluid.

Combustor 79, shown as an incinerator that combusts relatively low grade fuel, such as solid waste, for example, receives the steam condensate in line 78 by the operation of cycle pump 78A, and produces steam that is supplied by line 80 to steam superheater 71. Organic fluid vaporizer 81 receives the cooled exhaust gases in line 73 and produces vaporized organic fluid in line 82. Organic vapor turbine 83 is responsive to the vaporized organic fluid in line 82 for generating power and producing expanded organic fluid. Preferably, turbine 83 is coupled to generator 75 so that the generator is located between steam turbine 74 and organic vapor turbine 83.

Organic fluid condenser 84 condenses the expanded organic fluid and produces organic fluid condensate. Cycle pump 85 constitutes means for returning the organic fluid condensate to steam condenser 77 for preheating the organic fluid condensate. Pump 85 constitutes means for returning organic fluid preheated in steam condenser 77 to organic fluid vaporizer 81.

Figure 7:
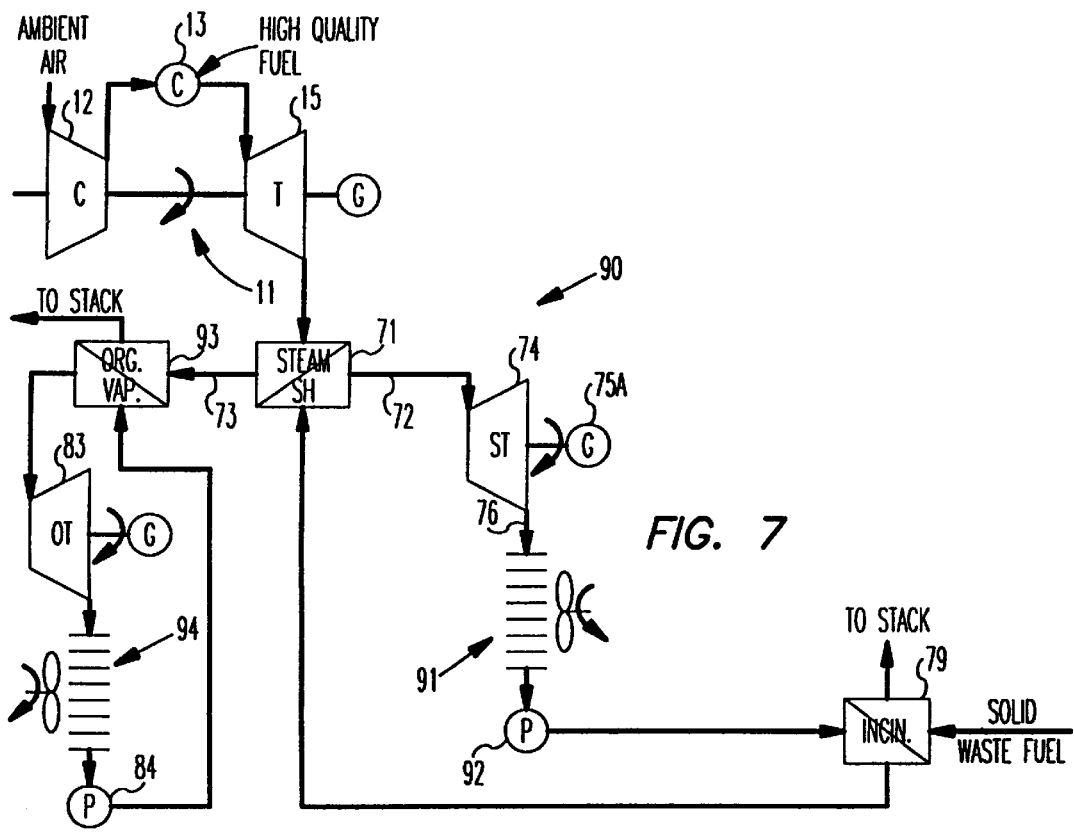

Power plant 90 in FIG. 7 illustrates a further aspect of the invention. Plant 90 includes gas turbine unit 11 including compressor 12 driven by gas turbine 15 using combustion chamber 13 for heating air compressed by the compressor. Exhaust gases from turbine 15 are applied to steam superheater 71 which is responsive to the exhaust gases for producing superheating steam in line 72, and cooled exhaust gases in line 73. Steam turbine 74, coupled to generator 75A, is responsive to the superheated steam in line 72 for generating power and expanded steam in line 76. Steam condenser 91, shown as being air-cooled, but which could be water-cooled, condenses the expanded steam into steam condensate which is pumped by pump 92 to combustor 79 like the combustor specified by the same reference numeral in FIG. 6. Relatively low grade fuel is combusted in combustor 79 converting the steam condensate into steam that is supplied to steam superheater 71.

Organic fluid vaporizer 93 receives the cooled exhaust gases in line 73 and produces vaporized organic fluid that is applied to organic vapor turbine 83 for generating power and producing expanded organic fluid. Organic fluid condenser 94, which is shown as being air-cooled, but which could also be water-cooled, condenses the expanded organic fluid and produces organic fluid condensate that is pumped by pump 84 back to organic fluid vaporizer 93.

Furthermore, while the embodiments of the present invention shown in FIGS. 1A–C, and 2–5 show the use of a combustion chamber for combusting high grade fuel, the embodiments can operate, although less effectively, without the use of such a combustion chamber.

The advantages and improved results furnished by the method and apparatus of the present invention are apparent from the foregoing description of the preferred embodiment the invention. Various changes and modifications may be made without departing from the scope of the invention as described in the appended claims.

We claim:

1. Apparatus for generating power comprising:
   a) a gas turbine unit having a compressor for compressing ambient air and producing compressed air, a combustion chamber to which said compressed air is supplied, a source of relatively high grade fuel for burning in said combustion chamber and producing combustion gases, a gas turbine connected to a load and to said compressor for expanding said combustion gases and driving said load, and for producing exhaust gases;
   b) an indirect contact heat exchanger responsive to combustion products for heating said compressed air before the latter is applied to said combustion chamber, and for producing cooled combustion products;
   c) a combustor for burning relatively low grade fuel and producing said combustion products;
   d) an energy converter for utilizing heat in said exhaust gases produced by said turbine for driving a second load and producing heat-depleted exhaust gases; and
   e) means for feeding back said heat-depleted exhaust gases to said combustor.

2. Apparatus according to claim 1 wherein said energy converter includes an organic working fluid, and is responsive to said exhaust gases for converting heat in said exhaust gases to electricity, and for producing said heat-depleted exhaust gases.

3. Apparatus according to claim 2 wherein said energy converter includes a vaporizer containing an organic fluid that is vaporized by said exhaust gases and which produces said heat-depleted exhaust gases, an organic vapor turbine responsive to vaporized organic fluid produced by said vaporizer for producing power and expanded organic vapor, and an organic vapor condenser responsive to said expanded organic vapor for condensing the latter to condensate, and means for returning said condensate to said vaporizer.

4. Apparatus according to claim 3 wherein said organic fluid is selected from the group consisting of normal pentane and iso-pentane.

5. Apparatus for generating power comprising:
   a) a gas turbine unit having a compressor for compressing ambient air and producing compressed air, a combustion chamber to which said compressed air is supplied, a source of relatively high grade fuel for burning in said combustion chamber and producing combustion gases, a gas turbine connected to a load and to said compressor for expanding said combustion gases and driving said load, and for producing exhaust gases;
   b) an indirect contact heat exchanger responsive to combustion products for heating said compressed air before the latter is applied to said combustion chamber, and for producing cooled combustion products;
   c) a combustor for burning relatively low grade fuel and producing said combustion products; and
   d) means utilizing heat in said exhaust gases produced by said turbine for driving a second load; and
   e) wherein the heating value of the fuel burned in said combustor varies over time, and said apparatus includes an element for generating a control signal related to the temperature of combustion gases produced by burning said fuel in said combustion chamber, and control means responsive to said control signal for controlling the rate at which fuel is burned in said combustion chamber in order to maintain said combustion gases at a substantially constant temperature independently of changes in the heating value of the fuel burned in said combustor.

6. Apparatus for generating power comprising:
   a) a gas turbine unit having a compressor for compressing ambient air and producing compressed air, a combustion chamber to which said compressed air is supplied, a source of relatively high grade fuel for burning in said combustion chamber and producing combustion gases, a gas turbine connected to a load and to said compressor for expanding said combustion gases and driving said load, and for producing exhaust gases;
   b) an indirect contact heat exchanger responsive to combustion products for heating said compressed air before the latter is applied to said combustion chamber, and for producing cooled combustion products;
   c) a combustor for burning relatively low grade fuel and producing said combustion products;
   d) means utilizing heat in said exhaust gases produced by said turbine for driving a second load; and
   e) a second energy converter responsive to said cooled combustion products for converting heat therein to electricity.

7. Apparatus according to claim 6 wherein said second energy converter includes a working fluid vaporizer containing a working fluid that is vaporized by said cooled combustion gases, a turbine responsive to vaporized working fluid produced by said working fluid vaporizer for producing power and expanded working fluid, a working fluid condenser responsive to said expanded working fluid for condensing the latter to working fluid condensate, and means for returning said working fluid to said working fluid vaporizer.

8. Apparatus according to claim 7 wherein said working fluid is an organic fluid selected from the group consisting of normal pentane or iso-pentane.

9. Apparatus according to claim 7 wherein said working fluid is water.

10. Apparatus according to claim 6 wherein said means for utilizing heat in said exhaust gases includes an energy converter.

11. Apparatus according to claim 10 wherein said energy converter operates on an organic working fluid, and is responsive to said exhaust gases for converting heat in said exhaust gases to electricity, and for producing cooled exhaust gases.

12. Apparatus according to claim 11 wherein said organic working fluid is selected from the group consisting of normal pentane or iso-pentane.

13. Apparatus for generating power comprising:
   a) a gas turbine unit having a compressor for compressing ambient air and producing compressed air, a combustion chamber to which said compressed air is supplied, a source of fuel for burning in said combustion chamber and producing combustion gases, a gas turbine connected to generator and to said compressor for expanding said combustion gases and producing exhaust gases;
   b) an indirect contact heat exchanger responsive to combustion products for heating said compressed air before the latter is applied to said combustion chamber, and for producing cooled combustion products;
   c) a combustor for burning fuel and producing said combustion products; and
   d) an energy converter responsive to said exhaust gases for converting heat in said exhaust gases to electricity;
   e) wherein the heating value of the fuel burned in said combustor varies over time, and said apparatus includes an element for generating a control signal related to the temperature of combustion gases produced by burning said fuel in said combustion chamber, and control means responsive to said control signal for controlling the rate at which fuel is burned in said combustion chamber in order to maintain said combustion gases at a substantially constant temperature independently of changes in the heating value of the fuel burned in said combustor.

14. Apparatus according to claim 13 wherein said energy converter includes a working fluid which is an organic fluid.

15. Apparatus according to claim 14 wherein said organic fluid is selected from the group consisting of normal pentane and iso-pentane.

16. Apparatus for generating power comprising:
   a) a gas turbine unit having a compressor for compressing ambient air and producing compressed air, a combustion chamber to which said compressed air is supplied, a source of fuel for burning in said combustion chamber and producing combustion gases, a gas turbine connected to generator and to said compressor for expanding said combustion gases and producing exhaust gases;
   b) an indirect contact heat exchanger responsive to combustion products for heating said compressed air before the latter is applied to said combustion chamber, and for producing cooled combustion products;
   c) a combustor for burning fuel and producing said combustion products;
   d) an energy converter including a vaporizer containing an organic fluid that is vaporized by said exhaust gases and which produces cooled exhaust gases, an organic vapor turbine responsive to vaporized organic fluid produced by said vaporizer for producing power and expanded organic vapor, and an organic vapor condenser responsive to said expanded organic vapor for condensing the latter to condensate, and means for returning said condensate to said vaporizer; and
   e) means for applying said cooled exhaust gases to said combustor.

* * * * *